(12) United States Patent
Potter et al.

(10) Patent No.: US 8,777,332 B2
(45) Date of Patent: Jul. 15, 2014

(54) BRAKING CONTROL SYSTEM

(75) Inventors: Laurence John Potter, Birmingham (GB); Robert David Prescott, West Midlands (GB); Edward Gilbert Shaw, Worcestershire (GB)

(73) Assignee: Haldex Brake Products Limited, Redditch, Worcestershire (GB)

(*) Notice: Subject to any disclaimer, the term of this patent is extended or adjusted under 35 U.S.C. 154(b) by 140 days.

(21) Appl. No.: 13/262,182

(22) PCT Filed: Feb. 23, 2010

(86) PCT No.: PCT/GB2010/050306
§ 371 (c)(1),
(2), (4) Date: Sep. 29, 2011

(87) PCT Pub. No.: WO2010/112879
PCT Pub. Date: Oct. 7, 2010

(65) Prior Publication Data
US 2012/0019054 A1    Jan. 26, 2012

(30) Foreign Application Priority Data

Apr. 1, 2009   (GB) .................................. 0905636.7

(51) Int. Cl.
*B60T 11/10* (2006.01)
*B60T 15/20* (2006.01)

(52) U.S. Cl.
USPC ............................................ 303/14; 303/123

(58) Field of Classification Search
USPC .............. 303/14, 40, 85, 123, DIG. 1, DIG. 2
See application file for complete search history.

(56) References Cited

U.S. PATENT DOCUMENTS 4,261,624 A * 4/1981 Plantan .............................. 303/7

FOREIGN PATENT DOCUMENTS

EP    0 547 407 A1    11/1992
(Continued)

OTHER PUBLICATIONS

International Search Report of PCT/GB2010/050306; Issued Jul. 5, 2010.

*Primary Examiner* — Anna Momper
(74) *Attorney, Agent, or Firm* — Young Basile Hanlon & MacFarlane P.C.

(57) ABSTRACT

A braking control system comprising a first source of pressurized fluid (82a), a second source of pressurized fluid (82b), a modulator (70), a brake actuator (10), and a plurality of valves (84, 94, 96, 98), the modulator (70) having a supply inlet (72) which may be connected to either of the sources of pressurized fluid via a first fluid flow line which extends between a first one of the valves (84) and the supply inlet (72), and a control inlet (78) which may be connected to either of the sources of pressurized fluid via a second fluid flow line and a second one of the valves (94), a delivery port (74) which is connected an inlet (11) of the actuator (10), and an exhaust outlet (76) which vents to a low pressure region, the modulator (70) being operable to move between a build position in which flow of fluid from the supply inlet (72) to the delivery port (74) is permitted while flow of fluid through the exhaust outlet (76) is substantially prevented, and an exhaust position in which flow of fluid between the delivery port (74) and the exhaust outlet (76) is permitted, while flow of fluid through the supply inlet (72) is substantially prevented, wherein a portion of the fluid flow line connecting the second source of pressurized fluid (82b, 90) to the first valve (84) also provides a proportion of the connection between the second source of pressurized fluid (82b, 90) and the second valve (94).

15 Claims, 3 Drawing Sheets

(56) References Cited

FOREIGN PATENT DOCUMENTS

| | | |
|---|---|---|
| GB | 2234028 | 1/1991 |
| WO | WO 9511823 A2 * | 5/1995 |
| WO | WO 99/24299 | 5/1999 |
| WO | WO 01/25067 | 4/2001 |
| WO | WO 2005/063540 | 7/2005 |

* cited by examiner

BRAKING CONTROL SYSTEM

CROSS-REFERENCE TO RELATED APPLICATION

This application is a U.S. national phase of PCT/GB2010/050306, filed Feb. 23, 2010, and claims priority to GB 0905636.7, filed Apr. 1, 2009, the disclosures of which are incorporated herein by reference for all purposes.

FIELD OF THE INVENTION

The present invention relates to a braking control system particularly, but not exclusively for use in the electronic braking system of a heavy goods vehicle.

BACKGROUND OF THE INVENTION

In electronic braking systems for heavy goods vehicles, it is a legal requirement to provide failure redundancy in the brake system so that, in the event of a failure in the brake system, the driver is able to stop the vehicle in a reasonable distance. In an electronically controlled brake system for a heavy goods vehicle, this redundancy commonly takes the form of providing two pneumatic back-up circuits in addition to the normal electronic control to maintain braking capability in the event of an electrical power failure and/or the loss of a pneumatic reservoir. In order to achieve this, it is necessary to provide pneumatic connections between at least two separate pressurised fluid reservoirs and the arrangement of valves used to control supply of pressurised fluid to a brake actuator. It is advantageous to minimise the number of pipes used to provide the required back-up facility, particularly if the arrangement of valves is mounted adjacent the brake actuator in a wheel mounted unit, whilst the reservoir is mounted centrally on the chassis of the vehicle.

SUMMARY OF THE INVENTION

According to the invention, we provide, in one embodiment, a braking control system comprising a first source of pressurised fluid, a second source of pressurised fluid, a modulator, a brake actuator, and a plurality of valves, the modulator having a supply inlet which may be connected to either of the sources of pressurised fluid via a first fluid flow line which extends between a first one of the valves and the supply inlet, and a control inlet which may be connected to either of the sources of pressurised fluid via a second fluid flow line and a second one of the valves, a delivery port which is connected to an inlet of the actuator, and an exhaust outlet which vents to a low pressure region, the modulator being operable to move between a build position in which flow of fluid from the supply inlet to the delivery port is permitted whilst flow of fluid through the exhaust outlet is substantially prevented, and an exhaust position in which flow of fluid between the delivery port and the exhaust outlet is permitted, whilst flow of fluid through the supply inlet is substantially prevented, wherein a portion of the fluid flow line connecting the second source of pressurised fluid to the first valve also provides a proportion of the connection between the second source of pressurised fluid and the second valve.

By virtue of this arrangement, only two fluid flow lines are required to be provided between the sources of pressurised fluid and the assembly of valves, modulator and actuator.

Preferably, the first valve is movable between a first configuration in which the first source of pressurised fluid is connected to the first fluid flow line and a second configuration in which the second source of pressurised fluid is connected to the first fluid flow line.

Further preferably, the second valve is movable between a first configuration in which the first source of pressurised fluid is connected to the second fluid flow line and a second configuration in which the second source of pressurised fluid is connected to the second fluid flow line.

The first source of pressurised fluid may comprise a first pressurised fluid reservoir, whilst the second source of pressurised fluid comprises a second pressurised fluid reservoir and a pressure modifying means which is operable to vary the pressure of fluid passing from the second pressurised fluid reservoir to the first and second valves. The pressure modifying means preferably comprises a brake pedal, operation of which causes a variation in the pressure of fluid passing from the second pressurised fluid reservoir to the first and second valves. The pressure modifying means may thus provide a fluid pressure signal which is indicative of driver demand for braking.

The first valve preferably includes a first inlet port, a second inlet port, an outlet port and a valve member which is movable between a first position in which flow of fluid between the first inlet port and the outlet port is permitted and flow of fluid through the second inlet port is substantially prevented, and a second position in which flow of fluid between the second inlet port and the outlet port is permitted and flow of fluid through the first inlet port is substantially prevented. In this case, preferably the valve is constructed such that the valve member moves to the first position if the fluid pressure at the first inlet port exceeds the fluid pressure at the second inlet port, and moves to the second position if the fluid pressure at the second inlet port exceeds the fluid pressure at the first inlet port.

The outlet port of the first valve may be connected to the supply inlet of the modulator. The first inlet port of the first valve is preferably connected to the first supply of pressurised fluid whilst the second inlet port is preferably connected to the second supply of pressurised fluid.

The second valve preferably includes a first inlet port, a second inlet port, an outlet port, and a valve member which is movable between a first position in which flow of fluid between the first inlet port and the outlet port is permitted, and flow of fluid through the second inlet port is substantially prevented, and a second position in which flow of fluid between the second inlet port and the outlet port is permitted, and flow of fluid through the first inlet port is substantially prevented. In this case, the second valve preferably also includes resilient biasing means which urges the valve member into the first position, and electrical means for moving the valve member against the biasing force of the resilient biasing means from the first position to the second position.

The first inlet port of the second valve is preferably connected to the second source of pressurised fluid, whilst the second inlet port is connected to the first source of pressurised fluid. The outlet port of the second valve is preferably connected to the control inlet of the modulator via a third valve. In this case, preferably the third valve includes a valve member which is movable between a first position in which flow of fluid between the outlet port of the second valve and the control inlet of the modulator is permitted and a second position in which such fluid flow is substantially prevented. The third valve may further be provided with resilient biasing means which urges the valve member to the first position, and electrical means for moving the valve member against the biasing force of the spring from the first position to the second position.

A fourth valve may be provided between the control inlet of the modulator and a region of low pressure fluid. In this case, preferably the fourth valve includes a valve member which is movable between a first position in which flow of fluid between the control inlet of the modulator and the region of low pressure fluid is substantially prevented and a second position in which such fluid flow is permitted. The fourth valve may further be provided with resilient biasing means which urges the valve member to the first position, and electrical means for moving the valve member against the biasing force of the spring from the first position to the second position.

The actuator preferably includes a brake actuating member which is operable by the supply of pressurised fluid to its inlet to move between an extended position and a retracted position. In this case, the actuator is preferably configured such that supply of pressurised fluid to its inlet causes the brake actuating member to move from the retracted position to the extended position.

The modulator is preferably configured so that supply of pressurised fluid to the control inlet causes the modulator to move to the build position, and release of pressurised fluid from the control inlet causes the modulator to move to the exhaust position. The modulator is also preferably configured to move to a hold position, in which fluid flow through the supply inlet, delivery port and exhaust outlet is substantially prevented, on the prevention of fluid passing through the control inlet.

BRIEF DESCRIPTION OF THE DRAWINGS

An embodiment of the invention will now be described with reference to the accompanying drawings of which.

DETAILED EMBODIMENTS OF THE INVENTION

Figure 1:
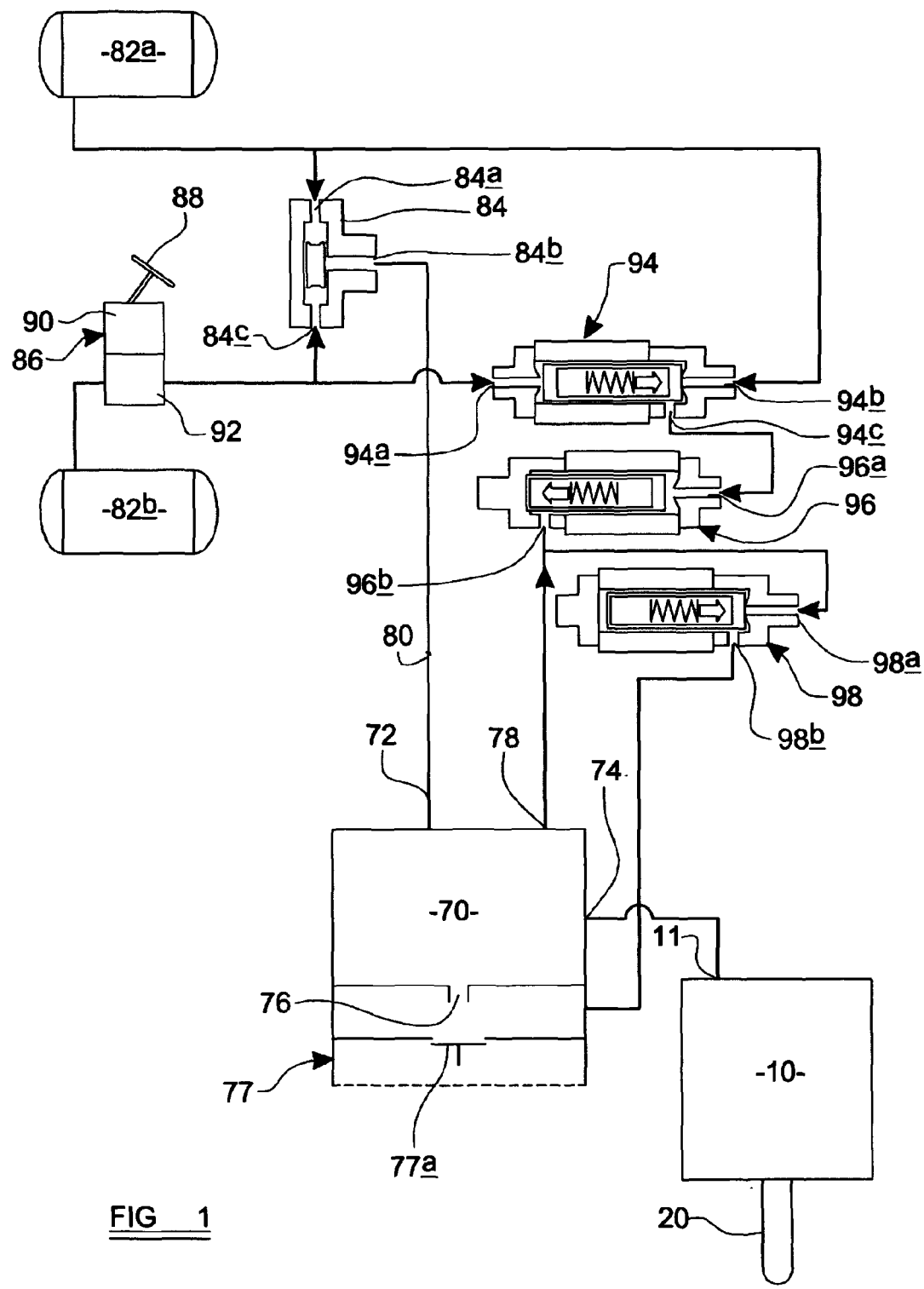
FIG. 1 shows a schematic illustration of a first embodiment of braking control system according to the invention.

Referring now to FIG. 1, there is shown a brake actuator 10 having an inlet 11, supply of pressurised fluid to which causes a brake actuating member 20 to move from a brake release position to a brake apply position in which a braking force generally proportional to the pressure of fluid at the inlet 11 is applied to a vehicle brake to which the actuator 10 is connected. Various configurations of brake actuator operating in this way are well known in the art.

There is also shown a modulator 70 having a supply inlet 72, a delivery port 74, an exhaust outlet 76 and a control port 78. The modulator 70 includes an arrangement of pistons or diaphragms, movement of which is controlled by flow of pressurised fluid through the control port 78. The pistons or diaphragms can be controlled so that the modulator adopts one of three working states—a build configuration in which the supply inlet 72 is connected to the delivery port 74 and flow of fluid through the exhaust port 76 is substantially prevented, an exhaust configuration in which the delivery port 74 is connected to the exhaust port 76 and flow of fluid through the supply inlet 72 is substantially prevented, and a hold or lapped configuration in which flow of fluid through all three of the supply inlet 72, delivery port 74 and exhaust outlet 76 is substantially prevented. Various possible arrangements for achieving this are well known, and therefore are not described in detail here. Examples are described in our co-pending UK patent application GB0902989.3, or application GB2407131.

The exhaust outlet 76 vents to a low pressure region, in this example, to atmosphere via a water exclusion valve 77 which includes a valve member 77a which is biased to a closed position in which flow of fluid from the atmosphere, which may include water and/or salt, into the modulator via the exhaust outlet 76 is substantially prevented, but moves to open the exhaust outlet 76 when fluid pressure at the exhaust outlet builds to a minimal level, thus allowing fluid to be exhausted from the modulator 70. The water exclusion valve 77 may be as described in our co-pending UK patent application GB0902990.1.

The delivery port 74 of the modulator 70 is connected to the inlet 11 of the actuator 10, whilst the supply inlet 72 is connected to a supply of pressurised fluid via a supply line 80. The supply of pressurised fluid comprises first 82a and second 82b pressurised fluid reservoirs and a double check valve 84. The double check valve 84 has a first inlet port 84a which is connected to the first compressed air reservoir, and an outlet port 84b which is connected to the supply line 80. The second pressurised fluid reservoir 82b is connected to a brake pedal valve assembly 86 comprising a brake pedal 88, an electrical braking demand signal generator 90 and a fluid pressure braking demand signal generator 92 which is supplied with pressurised fluid from the second reservoir 82b. Typically, the pressurised fluid used is compressed air.

The electrical braking demand signal generator 90 is configured so that on operation of the brake pedal by a driver of the vehicle in which the system is fitted causes the generation of an electrical braking demand signal which is generally proportional to the degree of deflection of the brake pedal, and hence indicative of the level of braking required by the driver. This signal is transmitted to a braking electronic control unit (not shown).

Similarly, the pneumatic braking demand signal generator 92 is configured so that on operation of the brake pedal 88 by a driver of the vehicle in which the system is fitted causes the generation of a fluid pressure braking demand signal (using fluid from the second reservoir 82b) the pressure of which is generally proportional to the degree of deflection of the brake pedal, and hence indicative of the level of braking required by the driver. This signal is transmitted via a fluid flow line to a second inlet port 84c of the double check valve 84, and also to a first inlet port 94a of a three port, two position valve hereinafter referred to as the redundancy valve 94.

The double check valve 84 is provided with a valve member which, if the pressure at the first inlet port 84a exceeds the pressure at the second inlet port 84c, moves to a first position to close the second inlet port 84c and connect the first inlet port 84a to the outlet port 84b and, if the pressure at the second inlet port 84c exceeds the pressure at the first inlet port 84a, moves to a second position to close the first inlet port 84a and connect the second inlet port 84c and the outlet port 84b.

The redundancy valve 94 is, in this example, a solenoid operated valve which, in addition to the first inlet port 94a, has a second inlet port 94b which is connected to the first pressurised fluid reservoir 82a, an outlet port 94c, and a valve member which is biased using a resilient biasing means such as a helical spring into a first position in which the first inlet port 94a communicates with the outlet port 94c and the second inlet port 94b is closed. In this example, a solenoid is provided, passage of an electrical current through the solenoid causing the valve member to move from the first position to a second position in which the first inlet port 94a is closed and the second inlet port 94b communicates with the outlet port 94c. Also in this example, the second inlet port 94b of the redundancy valve 94 is connected to the first reservoir 82a via a direct line. It should be appreciated, however, that the second inlet port 94b could equally be connected to the first reservoir 82a via the outlet port 84b of the double check valve 84.

The outlet port 94c of the redundancy valve 94 is connected to an inlet port 96a of a two port, two position valve, hereinafter referred to as the build valve 96. The build valve 96 is, in this example, a solenoid operated valve which, in addition to the inlet port 96a, has an outlet port 96b, and a valve member which is biased using a resilient biasing means such as a helical spring into a first position in which fluid flow from the inlet port 96a to the outlet port 96b is permitted. In this example, a solenoid is provided, passage of an electrical current through the solenoid causing the valve member to move from the first position to a second position in which fluid flow from the inlet port 96a to the outlet port 96b is substantially prevented.

The outlet port 96b of the build valve 96 is connected to the control port 78 of the modulator 70 and to the inlet port 98a of a second two port, two position valve, hereinafter referred to as the exhaust valve 98. The exhaust valve 98 is, in this example, a solenoid operated valve which, in addition to the inlet port 98a, has an outlet port 98b, and a valve member which is biased using a resilient biasing means such as a helical spring into a first position in which fluid flow from the inlet port 98a to the outlet port 98b is substantially prevented. In this example, a solenoid is provided, passage of an electrical current through the solenoid causing the valve member to move from the first position to a second position in which fluid flow from the inlet port 98a to the outlet port 96b is permitted. The outlet port 98b of the exhaust valve 98 could simply be vented to atmosphere, but in this example is connected to the exhaust port 76 of the modulator 70 so that it vents to atmosphere via the water exclusion valve 77 which acts to prevent ingress of atmospheric fluids into the exhaust valve 98 in addition to the modulator 70.

Advantageously, in order to achieve a compact braking system, the ECU and redundancy 94, build 96, and exhaust 98 valves are located in the modulator housing.

The system is operated as follows. During normal driving of the vehicle, when there is no demand for braking, the system adopts the configuration illustrated in FIG. 1. There is no pneumatic braking control signal, so the valve member of the double check valve 84 is pushed by the pressure of fluid in the first reservoir 82a to the first position so that the supply line 80 is connected to the first reservoir 82a. Pressurised fluid at reservoir pressure is therefore supplied to the inlet of the modulator 70.

No electrical power is supplied to the redundancy valve 94, the build valve 96 or the exhaust valve 98, so in each case, the valve member moves to its rest position, i.e. the position into which it is biased by the resilient biasing means. As such, whilst pressurised fluid is supplied to the second inlet port 94b of the redundancy valve 94, the second inlet port 94b is closed, and the first inlet 94a connected to the outlet port 94c, which is in turn connected to the control inlet 78 of the modulator 70 via the build valve 96. There is, however, no fluid pressure braking demand signal, so no pressurised fluid is supplied to the control inlet 78 of the modulator 70. This causes the modulator 70 to adopt the exhaust configuration, in which the delivery port 74 is connected to the exhaust port 76 and therefore vents to atmosphere. As a result, the brake actuating member 20 is in the brake release position.

When service braking is required, the brake pedal 88 is actuated which causes the electrical braking demand signal generator 90 to generate an electrical braking demand signal and to transmit this to the braking ECU (not shown). The braking ECU is connected to the solenoids of the redundancy, build, exhaust and locking control valves 94, 96, 98, 100, and an electrical current is applied to the solenoid of the redundancy valve 94 which causes the valve member to move to the second position in which the second inlet 94b is connected to the outlet port 94c. Pressurised fluid from the first reservoir 82a is therefore supplied to the control inlet 78 of the modulator 70 via the build valve 96. This causes the modulator 70 to adopt the build configuration in which the supply inlet 72 is connected to the delivery port 74 whilst the exhaust outlet 76 is closed. Pressurised fluid is therefore supplied to the inlet 11 of the brake actuator 10, which causes the brake actuating member 20 to move to the brake apply position and actuate the vehicle brakes.

A pressure sensor is provided to monitor the pressure in the actuator 10, and this transmits an electrical pressure signal to the ECU. When the ECU determines that the pressure in the actuator 10 is at the level demanded by the braking demand signal, electrical signals are transmitted to the solenoids of the build valve 96, so that the valve member of the build valve 96 moves to the second position, and closes the inlet port 96a. The modulator 70 then moves to the hold configuration in which the delivery port 74 is effectively closed, and therefore the pressure in the actuator 10, and hence the braking force is maintained at the desired level.

When the driver demand for braking pressure is no longer present, and the braking demand signal falls to zero, the ECU sends an electrical current to the exhaust valve 98 so that the control inlet 78 of the modulator 70 vents to atmosphere until the pressure at the control inlet 78 is reduced to atmospheric pressure, and the modulator 70 moves to the exhaust position. At this point, the delivery port 74 of the modulator 70 becomes connected to the exhaust port 76, and the fluid pressure supplied to the actuator 10 falls to atmospheric pressure too. The brake actuating member 20 therefore moves back to the brake release position, and the braking force is removed.

This is how service braking is normally operated, however, it is desired to provide a back-up system which enables service braking in the event of a complete electrical power failure and/or accidental loss of pressure in the first reservoir 82a through a fractured line or the like. As mentioned previously, actuation of the brake pedal 88 causes a fluid pressure braking signal demand signal to be transmitted to the double check valve 84 and to the first inlet port 94a of the redundancy valve 94.

In the event of electrical power failure, the redundancy, build and exhaust valves 94, 96, 98 are in their rest positions, and, as such, the first inlet port 94a of the redundancy valve 94 is connected to the control inlet 78 of the modulator 70 via the build valve 96, and the exhaust valve 98 is closed. As such, the fluid pressure braking demand signal from the second reservoir 82b causes the modulator 70 to move to the build configuration, and allow passage of fluid from the first reservoir 82a from the supply inlet 72 of the modulator 70 to the brake actuator 10 to operate the brakes.

In the event of loss of pressure in the first reservoir 82a, the valve member of the double check valve 84 will move automatically to allow passage of the fluid pressure braking demand signal to the supply line 80, whilst closing the connection between the supply line 80 and the first reservoir 82a. The fluid pressure braking demand signal will therefore pass via the supply line to the supply inlet 72 of the modulator 70, and also to the control inlet 78 of the modulator 70 via the redundancy valve 94 and build valve 96.

The pressure of the fluid pressure braking demand signal at the control inlet 78 of the modulator 70 causes the modulator 70 to adopt the build position, so that the fluid pressure braking demand signal at the supply inlet 72 passes via the delivery outlet 74 to the actuator inlet 11 and therefore to actuate the vehicle brakes as before. The supply of pressurised fluid for brake actuation is therefore supplied by the second reservoir 82b. This applies whether or not there is electrical power supply to the system, and therefore braking can be achieved in the event that there is total loss of electrical power to the braking system at the same time as loss of pressure in the first reservoir 82a.

It should also be noted that, by virtue of this arrangement, this back-up provision can be achieved with only two fluid flow lines connecting the reservoirs to the assembly of valves 84, 94, 96, and 98, modulator 70 and actuator 10. This is particularly important when these are wheel mounted, as opposed to mounted more centrally on the vehicle chassis, as minimising the number of fluid flow lines extending to each wheel can be advantageous in terms of space and cost saving.

Figure 2:
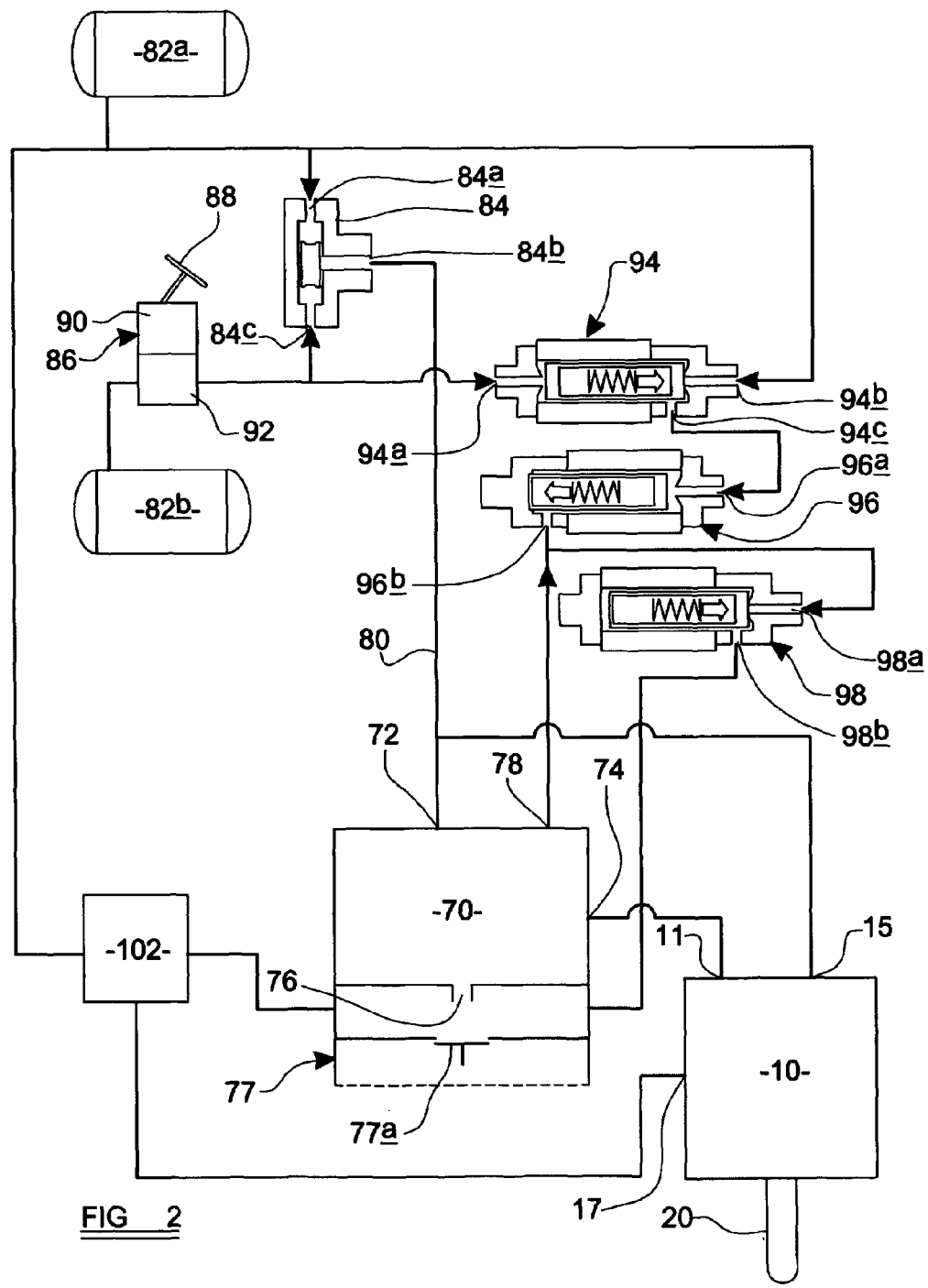
FIG. 2 shows a schematic illustration of a second embodiment of braking control system according to the invention.

This arrangement can also be used in the control of a brake actuator with additional parking brake control. In this instance, the actuator 10 could include a spring brake for parking, in addition to means for providing service braking. Specifically, such an actuator includes a spring which acts to move the brake actuating member to the brake apply position and is configured such that supply of pressurised fluid to a spring brake inlet 15 moves the brake actuating member 20 against the biasing force of the spring to the brake release position. Such actuators are well known, and examples are described in patent application number GB2415010, for example. FIG. 2 shows a schematic illustration of a control system according to the invention for use with a spring brake actuator. In this case, an additional spring brake exhaust valve 102 is provided and, in this example, has an inlet port which is connected to the first reservoir 82a, an outlet port which is connected to a spring brake inlet port 17 provided in the brake actuator 10, and an exhaust port which is connected to the exhaust port 76 of the modulator 70. In order to release the spring brake, the spring brake valve 102 is operated to connect the first pressurised fluid reservoir 82a to the spring brake inlet port 17 of the actuator 10, and to apply the spring brake, the spring brake valve 102 is operated to connect the spring brake inlet port 17 of the actuator 10 to the exhaust port 76.

Figure 3:
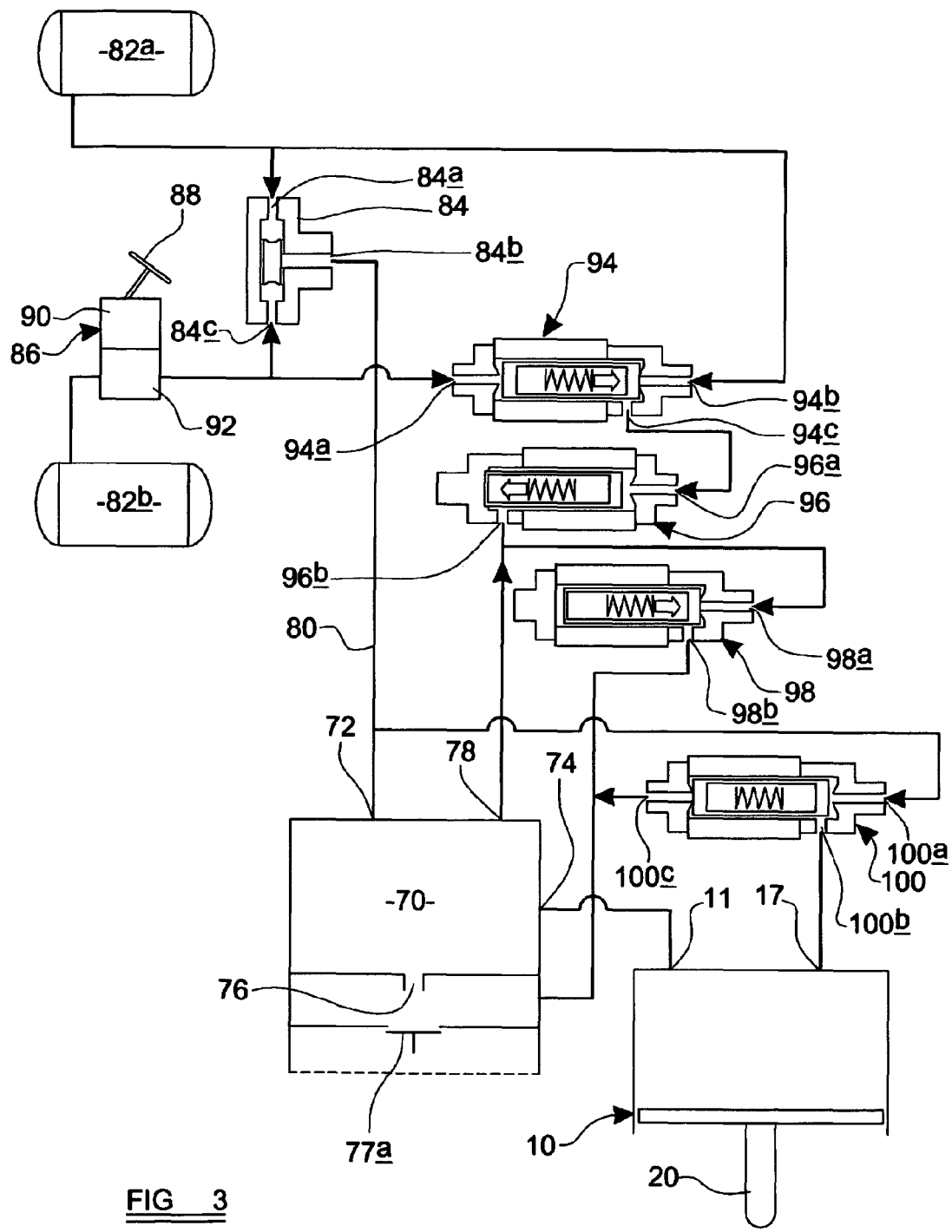
FIG. 3 shows a schematic illustration of a third embodiment of braking control system according to the invention.

The parking brake control could equally be provided by virtue of the use of a lock actuator, in which mechanical means for locking the brake actuating member 20 in the brake apply position is provided. Such locking means may be fluid pressure operated, and a control system according to the invention suitable for use with a fluid pressure operated lock actuator is illustrated in FIG. 3.

This includes an additional fluid flow line which extends from the supply line between the double check valve 84 and the supply inlet 72 of the modulator 70, and a further three port, two position valve, hereinafter referred to as the lock control valve 100. The lock control valve 100 has an inlet port 100a which is connected to the supply line 80, a delivery port 100b which is connected to a spring brake inlet port 17 of the brake actuator 10, and an exhaust port 100c. The exhaust port 100c may vent directly to atmosphere or any other low pressure region, but as with the exhaust valve 98, in this example, it is connected to the exhaust port 76 of the modulator 70 so that it vents to atmosphere via the water exclusion valve 77 which acts to prevent ingress of atmospheric fluids into the lock control valve 100. The lock control valve 100 also includes a valve member which is movable between a first position in which flow of fluid from the inlet port 100a to the outlet port 100b is permitted whilst the exhaust port 100c is closed, and a second position in which flow of fluid between the outlet port 100b and the exhaust port 100c is permitted whilst the inlet port 100a is closed. This valve 100 is provided with a solenoid, but, in this example, does not include resilient biasing means, and the valve member moves between the first and second positions only when an electrical current is passed through the solenoid. Such a valve is generally known as a bi-stable solenoid valve.

Other configurations of bi-stable solenoid valve may, of course, be used. For example, the valve 100 may include a magnet which holds the valve member in one of the first or second positions, a spring which holds the valve member in the other of the first or second positions, and a solenoid, passage of an electrical current through which one way causes the valve member to move against the biasing force of the spring, and the other way causes the valve member to move away from the magnet. If such a valve were used, it would preferably be oriented such that the spring holds the valve member in the first position, whilst the magnet holds the valve member in the second position. Equally, a purely mechanical mechanism for latching the valve member in each of the two positions may be employed, provided passage of an electrical current to the valve causes the valve member to move from the position it is latched in, to the other position.

The lock control valve 100 may therefore be operated to control the supply pressurised fluid to the locking mechanism. To apply the parking brake, the redundancy, build, and exhaust valves 94, 96, 98 are operated as described above in relation to the first embodiment of the invention to apply the brake, and then the lock actuated to lock the brake actuating member 20 in the brake apply position. If the locking mechanism is configured such that supply of pressurised fluid is required to apply the lock, this is achieved by moving the valve member of the lock control valve 100 to the first position, or if the locking mechanism is configured such that exhaustion of pressurised fluid from the mechanism is required to apply the lock, this is achieved by moving the valve member to the second position. An example of the latter type of lock actuator is described in detail in our co-pending UK patent applications GB 0905634.2, GB 0905637.5 and GB 0905635.9.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A braking control system comprising a first source of pressurised fluid, a second source of pressurised fluid, a modulator, a brake actuator, and a plurality of valves that includes a first valve and a second valve that are each connected to the first source of pressurized fluid and the second source of pressurized fluid, the modulator having a supply inlet connected to the first valve via a first fluid flow line, a control inlet connected to the second valve via a second fluid flow line, a delivery port connected to an inlet of the actuator, and an exhaust outlet which vents to a low pressure region, the modulator being operable to move between a build position in which flow of fluid from the supply inlet to the delivery port is permitted whilst flow of fluid through the exhaust outlet is substantially prevented, and an exhaust position in which flow of fluid between the delivery port and the exhaust outlet is permitted, whilst flow of fluid through the supply inlet is substantially prevented, wherein the second source of pressurized fluid is connected to the first valve and the second valve at least in part by a third fluid flow line over which flow of fluid is provided to both the first valve and the second valve from the second source of pressurised fluid, the first valve is movable between a first configuration in which the first source of pressurised fluid is in fluid communication with the first fluid flow line and a second configuration in which the second source of pressurised fluid is in fluid communication with the first fluid flow line, and the second valve is movable between a first configuration in which the first source of pressurised fluid is in fluid communication with the second fluid flow line and a second configuration in which the second source of pressurised fluid is in fluid communication with the second fluid flow line.

2. A braking control system according to claim 1, wherein the first source of pressurised fluid comprises a first pressurised fluid reservoir, whilst the second source of pressurised fluid comprises a second pressurised fluid reservoir and a pressure modifying means operable to vary the pressure of fluid passing from the second pressurised fluid reservoir to the first and second valves.

3. A braking control system according to claim 2, wherein the pressure modifying means comprises a brake pedal, operation of which causes a variation in the pressure of fluid passing from the second pressurised fluid reservoir to the first and second valves.

4. A braking control system according to claim 1, wherein the first valve includes a first inlet port connected to the first source of pressurised fluid, a second inlet port connected to the second supply of pressurised fluid, an outlet port connected to the supply inlet of the modulator, and a moveable valve member which when the valve is in the first configuration permits flow of fluid between the first inlet port and the outlet port and substantially prevents flow of fluid through the second inlet port, and when the valve is in the second configuration permits flow of fluid between the second inlet port and the outlet port and substantially prevents flow of fluid through the first inlet port, and the valve is constructed such that the valve moves to the first configuration if the fluid pressure at the first inlet port exceeds the fluid pressure at the second inlet port and moves to the second configuration if the fluid pressure at the second inlet port exceeds the fluid pressure at the first inlet port.

5. A braking control system according to claim 1, wherein the second valve includes a first inlet port connected to the second source of pressurised fluid, a second inlet port connected to the first source of pressurised fluid, an outlet port connected to the control inlet of the modulator, and a moveable valve member which when the valve is in the second configuration permits flow of fluid between the first inlet port and the outlet port and substantially prevents flow of fluid through the second inlet port, and when the valve is in the first configuration permits flow of fluid between the second inlet port and the outlet port and substantially prevents flow of fluid through the first inlet port, and the second valve also includes resilient biasing means which urges the valve member into the first configuration, and electrical means for moving the valve member against the biasing force of the resilient biasing means from the first configuration to the second configuration.

6. A braking control system according to claim 1, wherein the plurality of valves includes a fourth valve that is provided between a control inlet of the modulator and the region of low pressure fluid.

7. A braking control system according to claim 6, wherein the fourth valve includes a valve member movable between a first position in which flow of fluid between the control inlet of the modulator and the region of low pressure fluid is substantially prevented and a second position in which such fluid flow is permitted.

8. A braking control system according to claim 7, wherein the fourth valve is further provided with resilient biasing means which urges the valve member to the first position, and electrical means for moving the valve member against the biasing force of the spring from the first position to the second position.

9. A braking control system according to claim 1, wherein the brake actuator includes a brake actuating member operable by the supply of pressurised fluid to the inlet of the actuator to move between an extended position and a retracted position.

10. A braking control system according to claim 9, wherein the brake actuator is configured such that supply of pressurised fluid to the inlet of the actuator causes the brake actuating member to move from the retracted position to the extended position.

11. A braking control system according to claim 1, wherein the modulator is configured so that supply of pressurised fluid to the control inlet causes the modulator to move to the build position, and release of pressurised fluid from the control inlet causes the modulator to the exhaust position.

12. A braking control system according to claim 1, wherein the modulator is also configured to move to a hold position, in which fluid flow through the supply inlet, delivery port and exhaust outlet is substantially prevented, on the prevention of fluid passing through the control inlet.

13. A braking control system comprising a first source of pressurised fluid, a second source of pressurised fluid, a modulator, a brake actuator, and a plurality of valves that includes a first valve and a second valve that are each connected to the first source of pressurized fluid and the second source of pressurized fluid, the modulator having a supply inlet connected to the first valve via a first fluid flow line, a control inlet connected to the second valve via a second fluid flow line, a delivery port connected to an inlet of the actuator, and an exhaust outlet which vents to a low pressure region, the modulator being operable to move between a build position in which flow of fluid from the supply inlet to the delivery port is permitted whilst flow of fluid through the exhaust outlet is substantially prevented, and an exhaust position in which flow of fluid between the delivery port and the exhaust outlet is permitted, whilst flow of fluid through the supply inlet is substantially prevented, wherein the second source of pressurized fluid is connected to the first valve and the second valve at least in part by a third fluid flow line over which flow of fluid is provided to both the first valve and the second valve from the second source of pressurised fluid, the second valve is movable between a first configuration in which the first source of pressurised fluid is in fluid communication with the second fluid flow line and a second configuration in which the second source of pressurised fluid is in fluid communication with the second fluid flow line, the second valve includes a first inlet port connected to the second source of pressurised fluid, a second inlet port connected to the first source of pressurised fluid, an outlet port connected to the control inlet of the modulator, and a moveable valve member which when the valve is in the second configuration permits flow of fluid between the first inlet port and the outlet port and substantially prevents flow of fluid through the second inlet port, and when the valve is in the first configuration permits flow of fluid between the second inlet port and the outlet port and substantially prevents flow of fluid through the first inlet port, and the second valve also includes resilient biasing means which urges the valve member into the first configuration, and electrical means for moving the valve member against the biasing force of the resilient biasing means from the first configuration to the second configuration, and the plurality of valves includes a third valve and the outlet port of the second valve is connected to the control inlet of the modulator via the third valve.

14. A braking control system according to claim 13, wherein the third valve includes a valve member movable between a first position in which flow of fluid between the outlet port of the second valve and the control inlet of the modulator is permitted and a second position in which such fluid flow is substantially prevented.

15. A braking control system according to claim 14, wherein the third valve is further provided with resilient biasing means which urges the valve member to the first position, and electrical means for moving the valve member against the biasing force of the spring from the first position to the second position.

* * * * *